(12) United States Patent
Liou et al.

(10) Patent No.: US 11,716,457 B2
(45) Date of Patent: Aug. 1, 2023

(54) DISPLAY METHOD OF IMAGE

(71) Applicant: InnoLux Corporation, Miao-Li County (TW)

(72) Inventors: Hao-Yu Liou, Miao-Li County (TW); Ruey-Jer Weng, Miao-Li County (TW); Naoki Sumi, Miao-Li County (TW); Chih-Yung Hsieh, Miao-Li County (TW); Chung-Kuang Wei, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/680,202

(22) Filed: Feb. 24, 2022

(65) Prior Publication Data

US 2022/0311994 A1 Sep. 29, 2022

(30) Foreign Application Priority Data

Mar. 24, 2021 (CN) .......................... 202110315638.4

(51) Int. Cl.
| | |
|---|---|
| *A61B 8/00* | (2006.01) |
| *H04N 13/383* | (2018.01) |
| *G02B 30/36* | (2020.01) |
| *H04N 13/344* | (2018.01) |
| *H04N 13/398* | (2018.01) |
| *H04N 13/341* | (2018.01) |
| *G02B 30/10* | (2020.01) |

(52) U.S. Cl.
CPC ........... *H04N 13/383* (2018.05); *G02B 30/10* (2020.01); *G02B 30/36* (2020.01); *H04N 13/341* (2018.05); *H04N 13/344* (2018.05); *H04N 13/398* (2018.05)

(58) Field of Classification Search
CPC .. H04N 13/383; H04N 13/341; H04N 13/344; H04N 13/398; G02B 30/10; G02B 30/36; G02B 27/0093; G02B 30/27; G02B 2027/0138; G02B 2027/0187; G02B 27/0172; G02B 30/22; G09G 3/20
USPC .......................................................... 348/51
See application file for complete search history.

(56) References Cited

U.S. PATENT DOCUMENTS

| | | | | |
|---|---|---|---|---|
| 9,984,507 | B2 * | 5/2018 | Aksoy | .................. G06F 3/0346 |
| 10,108,261 | B1 * | 10/2018 | Hall | ........................ G06V 40/19 |
| 10,311,584 | B1 * | 6/2019 | Hall | ........................ G06T 7/251 |

(Continued)

FOREIGN PATENT DOCUMENTS

CN 112526763 A 3/2021

*Primary Examiner* — Gims S Philippe
(74) *Attorney, Agent, or Firm* — Winston Hsu

(57) ABSTRACT

A display method of an image is disclosed. A position of a vergence surface of a user is obtained through a gaze tracking device. An image is provided by a display, the image is located at a virtual image surface, and the image has an offset between different view directions. A controller is coupled to the gaze tracking device and the display. The controller receives an information of the position of the vergence surface obtained through the gaze tracking device, performs an algorithm processing according to the information to obtain the offset, and transmits a display information including the offset to the display. An eye of the user focuses on an accommodation surface when viewing the image, and a position of the accommodation surface is different from a position of the virtual image surface.

10 Claims, 10 Drawing Sheets

(56) References Cited

U.S. PATENT DOCUMENTS

| | | | |
|---|---|---|---|
| 10,319,266 B1* | 6/2019 | Percival | G09F 9/33 |
| 11,212,513 B2* | 12/2021 | Sumi | H04N 13/317 |
| 2017/0371161 A1* | 12/2017 | Castro Martinez | G02B 5/30 |
| 2020/0209958 A1* | 7/2020 | Sztuk | A63F 13/26 |

* cited by examiner

DISPLAY METHOD OF IMAGE

BACKGROUND OF THE DISCLOSURE

1. Field of the Disclosure

The present disclosure relates to a display method of an image, and more particularly to a display method which is able to mitigate the vergence-accommodation conflict of the user.

2. Description of the Prior Art

Three dimensional (3D) display technologies such as augmented reality (AR) and virtual reality (VR) have been widely used in various fields. In these technologies, images can be presented to the user through, for example, a heads-mounted display (HMD) or a near-eye display in glasses. However, the user may be influenced by the vergence-accommodation conflict when viewing these images, resulting in feeling uncomfortable. Therefore, how to mitigate the vergence-accommodation conflict is one of the urgent problems to be solved currently.

SUMMARY OF THE DISCLOSURE

An embodiment of the present disclosure provides a display method of an image, which includes the following steps. Obtaining a first position of a vergence surface of a user through a gaze tracking device. Providing an image by a display, the image is located at a virtual image surface, and the image has an offset between different view directions. Providing a controller coupled to the gaze tracking device and the display, the controller receives an information of the first position of the vergence surface obtained through the gaze tracking device, the controller performs an algorithm processing according to the information to obtain the offset, and the controller transmits a display information including the offset to the display. An eye of the user focusing on an accommodation surface when the eye of the user viewing the image. A first distance exists between the first position of the vergence surface and the eye, a second distance exists between a second position of the accommodation surface and the eye, a distance difference exists between the first distance and the second distance, and the distance difference satisfies a relation:

$$da+(dv/1.3052-0.2657*dv)<\Delta d<da-(dv/1.1286+0.442*dv),$$

wherein da represents the second distance, dv represents the first distance, and $\Delta d$ represents the distance difference.

Another embodiment of the present disclosure provides a display method of an image, which includes the following steps. Obtaining a first position of a vergence surface of a user through a gaze tracking device. Providing a plurality of pictures by a display, the plurality of pictures are different from each other, and the plurality of pictures are respectively provided by the display at a plurality of time points. The user receiving the plurality of pictures through an eye and perceiving that an image is located at a virtual image surface, the image has an offset between different view directions. Providing a controller coupled to the gaze tracking device and the display, the controller receives an information of the first position of the vergence surface obtained through the gaze tracking device, the controller performs an algorithm processing according to the information to obtain the offset, and the controller transmits a display information including the offset to the display. The eye of the user focusing on an accommodation surface when the eye of the user viewing the image. A first distance exists between the first position of the vergence surface and the eye, a second distance exists between a second position of the accommodation surface and the eye, a distance difference exists between the first distance and the second distance, and the distance difference satisfies a relation:

$$da+(dv/1.3052-0.2657*dv)<\Delta d<da-(dv/1.1286+0.442*dv),$$

wherein da represents the second distance, dv represents the first distance, and $\Delta d$ represents the distance difference.

These and other objectives of the present disclosure will no doubt become obvious to those of ordinary skill in the art after reading the following detailed description of the embodiment that is illustrated in the various figures and drawings.

DETAILED DESCRIPTION

Figure 1:
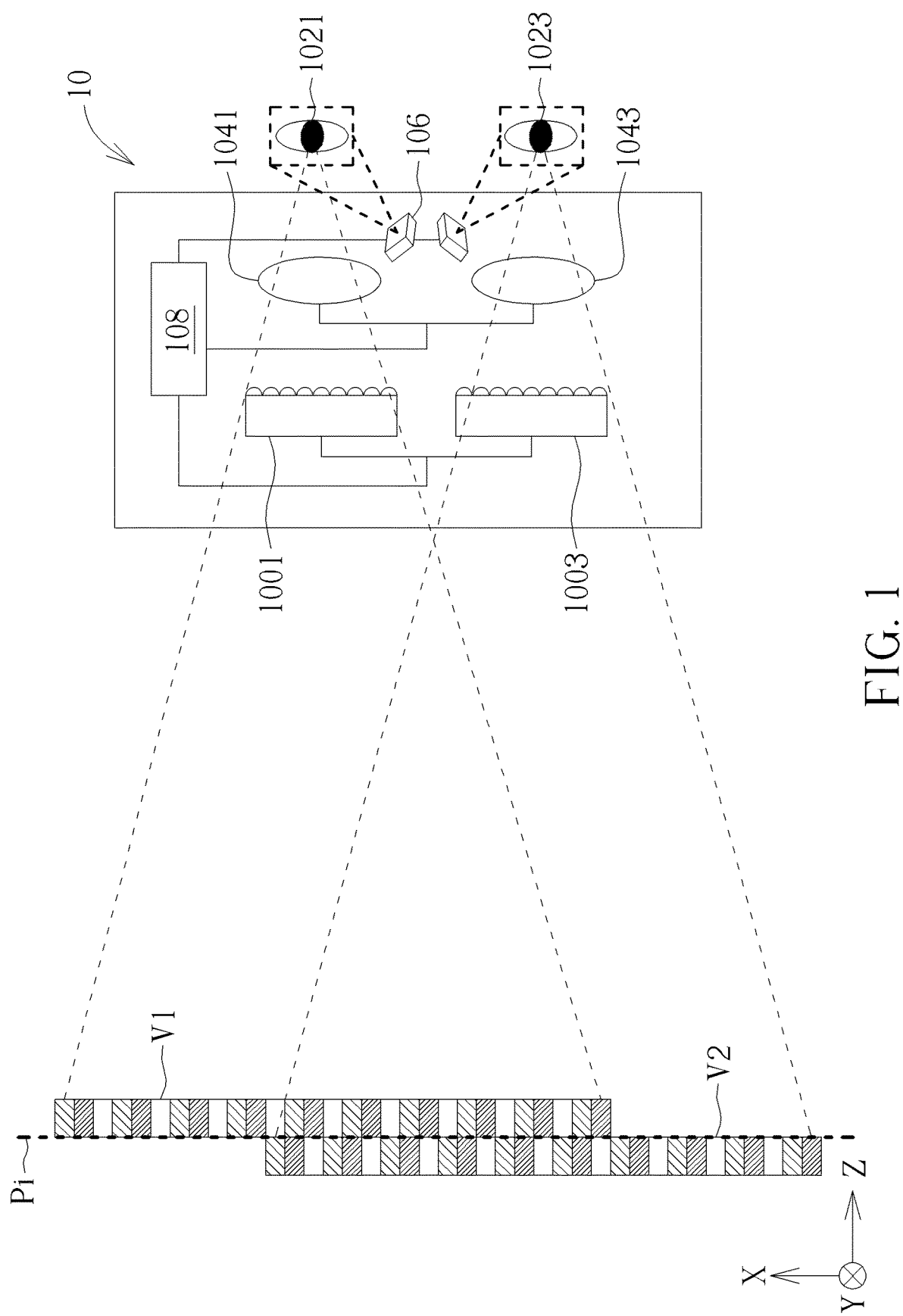
FIG. 1 is a schematic diagram of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each element shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

In addition, when an element is referred to as being "directly on", "directly disposed on", "directly connected to", or "directly coupled to" another element or layer, there are no intervening elements or layers presented.

The electrical connection may be direct connection or indirect connection. When two elements are electrically connected, the electrical signals may be transmitted by direct contact, and there are no other elements presented between the two elements. When two elements are electrically connected, the electrical signals may be transmitted through the intermediate element bridging the two elements. The term "electrically connecting" may also be referred to as "coupling".

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

The display device of the present disclosure may include a heads-mounted display, a heads-up display (HUD) or glasses, and the display device may include one or a plurality of near-eye display(s), but not limited herein. The display device of the present disclosure may include a touch display, a curved display or a free shape display, but not limited herein. The display device may be a bendable or flexible display device. The display device may, for example, include light-emitting diodes, liquid crystal, fluorescence, phosphors, other suitable display media or combinations of the above, but not limited herein. The light-emitting diodes may, for example, include organic light-emitting diodes (OLEDs), inorganic light-emitting diodes (LEDs), mini-light-emitting diodes (mini LEDs, millimeter sized LEDs), micro-light-emitting diodes (micro-LEDs, micrometer sized LEDs), quantum dots (QDs) light-emitting diodes (e.g. QLEDs or QDLEDs), other suitable light-emitting diodes or any combination of the above, but not limited herein. The concept or principle of the present disclosure may also be applied to non-self-emissive liquid crystal display (LCD), but not limited herein.

The display device may be any combination of the devices describe above, but not limited herein. In addition, the appearance of the display device may be rectangular, circular, polygonal, a shape with curved edges or other suitable shapes. The electronic device may have external systems such as a driving system, a control system, a light source system, a shelf system, etc. to support a display device.

A direction X, a direction Y and a direction Z are labeled in the following drawings. The direction Z may be perpendicular to the directions X and the direction Y, and the direction X may be perpendicular to the direction Y. For example, the direction Z may be perpendicular to a surface of a display 1001 or a display 1003, and the direction X and the direction Y may be parallel to the surface, but not limited herein. The following drawings may describe the spatial relationship according to direction X, the direction Y and the direction Z.

Please refer to FIG. 1. FIG. 1 is a schematic diagram of an electronic device according to a first embodiment of the present disclosure. The electronic device 10 may be, for example, a virtual reality system, an augmented reality system or other types of three-dimensional image display systems, but not limited herein. For example, the virtual reality system may include a heads-mounted display or a heads-up display, and the augmented reality system may include glasses, but not limited herein.

As shown in FIG. 1. The electronic device 10 may include a plurality of displays (e.g., a display 1001 and a display 1003), a plurality of optical elements (e.g., an optical element 1041 and an optical element 1043), a gaze tracking device 106 and a controller 108, but not limited herein. The controller 108 may be coupled to the display 1001, the display 1003, the optical element 1041, the optical element 1043 and the gaze tracking device 106.

The display 1001 and the display 1003 may be, for example, near-eye displays, but not limited herein. The display 1001 may correspond to an eye 1021 of a user, and the display 1003 may correspond to an eye 1023 of the user. The eye 1021 may be, for example, one of two eyes (such as the left eye), and the eye 1023 may be, for example, the other one of the two eyes (such as the right eye). In addition, the optical element 1041 may correspond to the eye 1021 of the user and may be disposed between the display 1001 and the eye 1021, and the optical element 1043 may correspond to the eye 1023 of the user and may be disposed between the display 1003 and the eye 1023. The optical element 1041 (or the optical element 1043) may include at least one lens, but not limited to herein.

For example, the display 1001 may provide an image, and this image may enter the eye 1021 through the optical element 1041 and form an image V1 on a virtual image surface Pi. On the other hand, the display 1003 may provide another image, and this another image may enter the eye 1023 through the optical element 1043 and form another image V2 on the virtual image surface Pi. The image V1 and the image V2 may be virtual images. In brief, the eye 1021 may view the image V1, and the eye 1023 may view the image V2.

Figure 2:
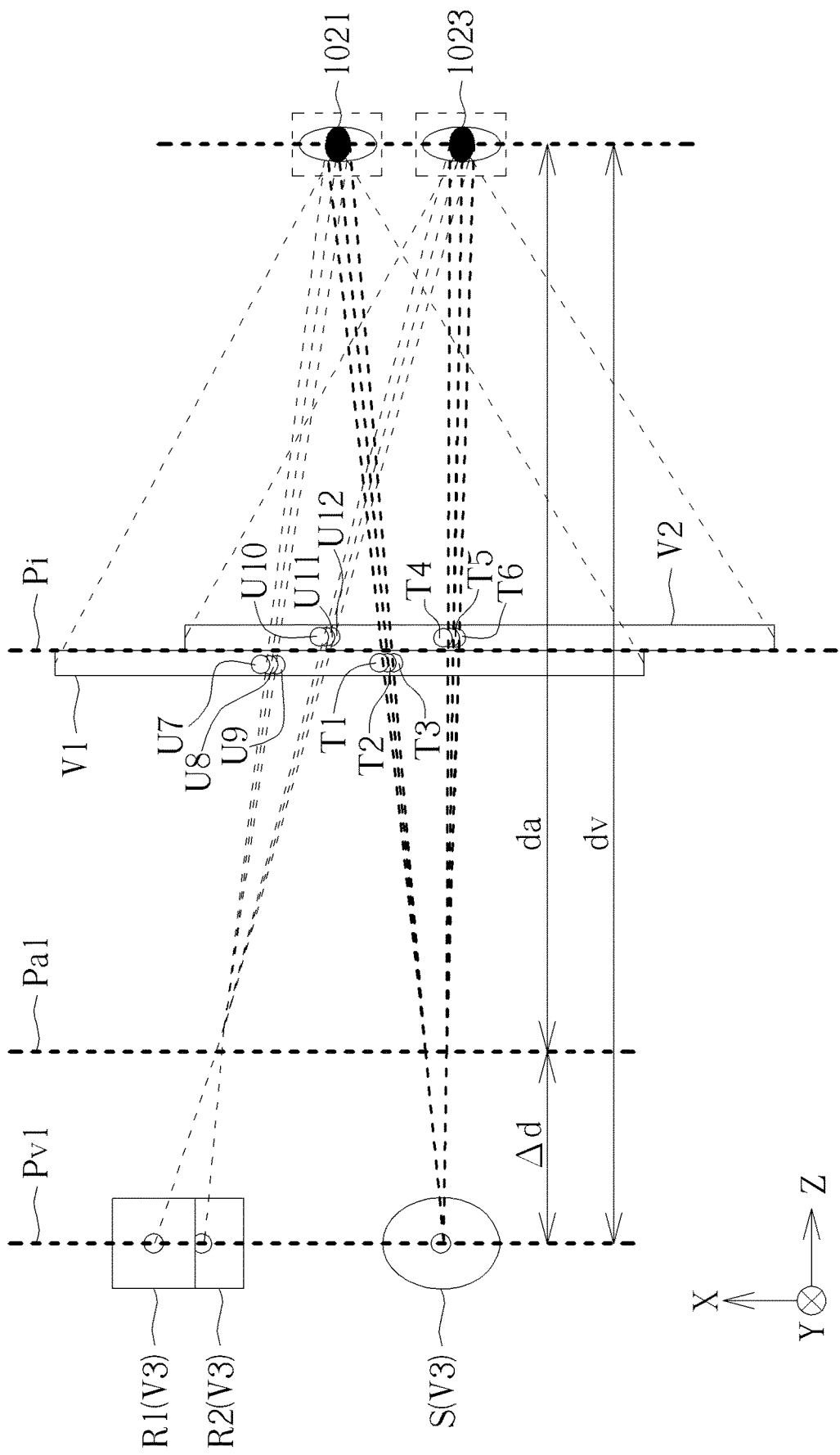
FIG. 2 is a schematic diagram of an example for a display method of an image according to the first embodiment.

Please refer to FIG. 2. FIG. 2 is a schematic diagram of an example for a display method of an image according to the first embodiment. The electronic device 10 in FIG. 1 is omitted in FIG. 2 for simplifying the drawings, and the image V1 and the image V2 in FIG. 2 may be respectively provided by the display 1001 and the display 1003 and formed on the virtual image surface Pi through the optical element 1041 and the optical element 1043. When the user uses the electronic device 10 in FIG. 1, the eye 1021 may view the image V1 and focus on an accommodation surface Pa1, the eye 1023 may view the image V2 and also focus on the accommodation surface Pa1, and the eye 1021 and the eye 1023 may converge on a vergence surface Pv1. The accommodation surface and the vergence surface may be planar or non-planar. On the other hand, the content of the image V1 corresponding to the eye 1021 may be different from the content of the image V2 corresponding to the eye 1023. The difference between the image V1 and the image V2 may make the brain of the user perceive or produce a three-dimensional virtual picture V3 on the vergence surface Pv1 after synthesizing the image V1 and the image V2.

The position of the accommodation surface is the same as the position of the virtual image surface when the user uses the conventional device, which leads to a great distance difference between the position of the accommodation surface and the position of the vergence surface, thereby causing the user to be influenced by the vergence-accommodation conflict and to feel uncomfortable. However, in the present disclosure, by adjusting the position of the accommodation surface Pa1 of the eye 1021 and the eye 1023, the position of the accommodation surface Pa1 may be different from the position of the virtual image surface Pi, or the accommodation surface Pa1 may be located between the vergence surface Pv1 and the virtual image surface Pi in the direction Z. Accordingly, the distance difference between the position of the accommodation surface Pa1 and the position of the vergence surface Pv1 may be reduced, thereby mitigating the discomfort of the user caused by the vergence-accommodation conflict. The positions of the virtual image surface Pi, the accommodation surface Pa1 and the vergence surface Pv1 described above may be, for example, the positions in the direction Z in FIG. 2.

Figure 3:
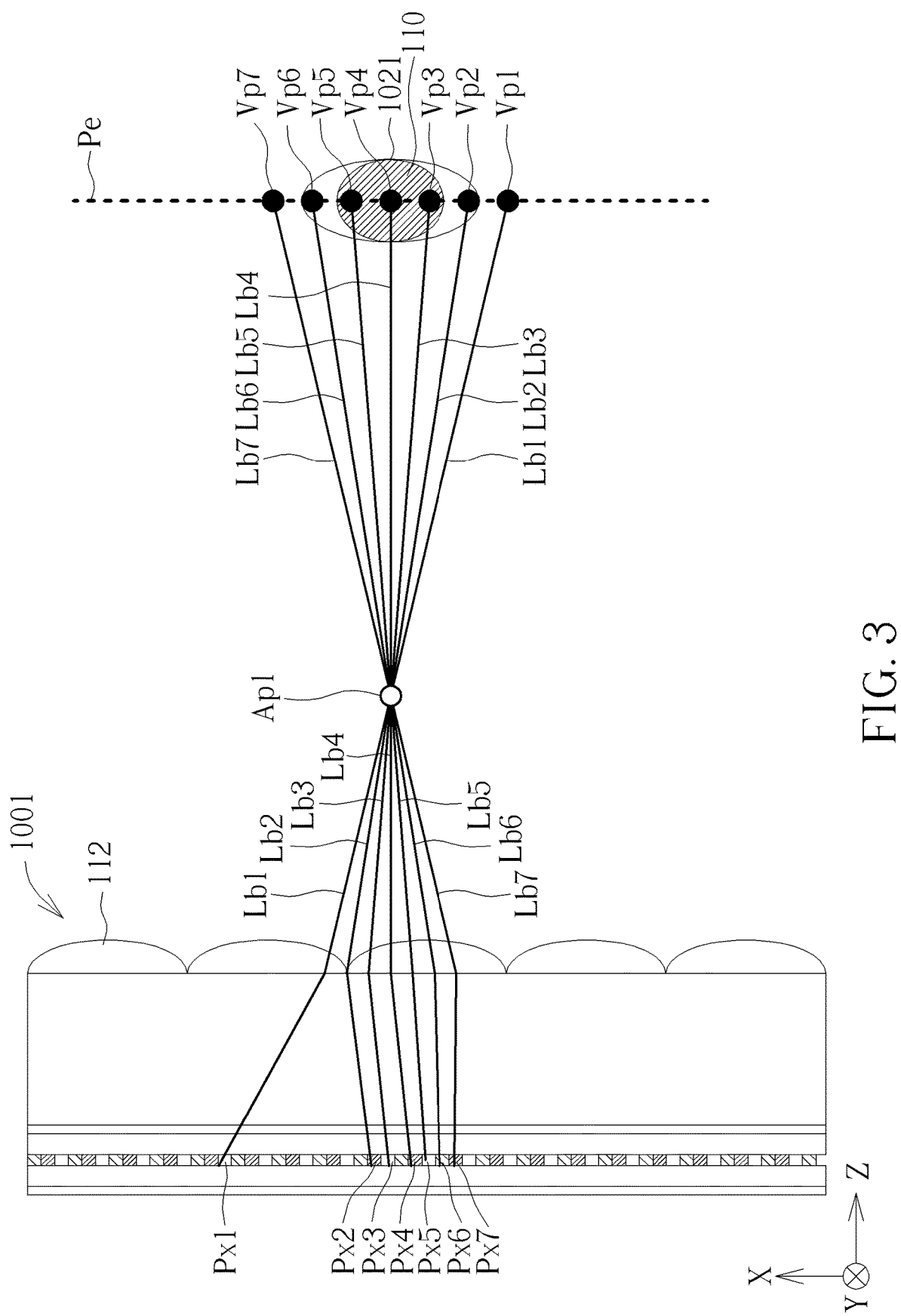
FIG. 3 is a schematic diagram of an example for focusing of an eye according to the present disclosure.
Figure 4:
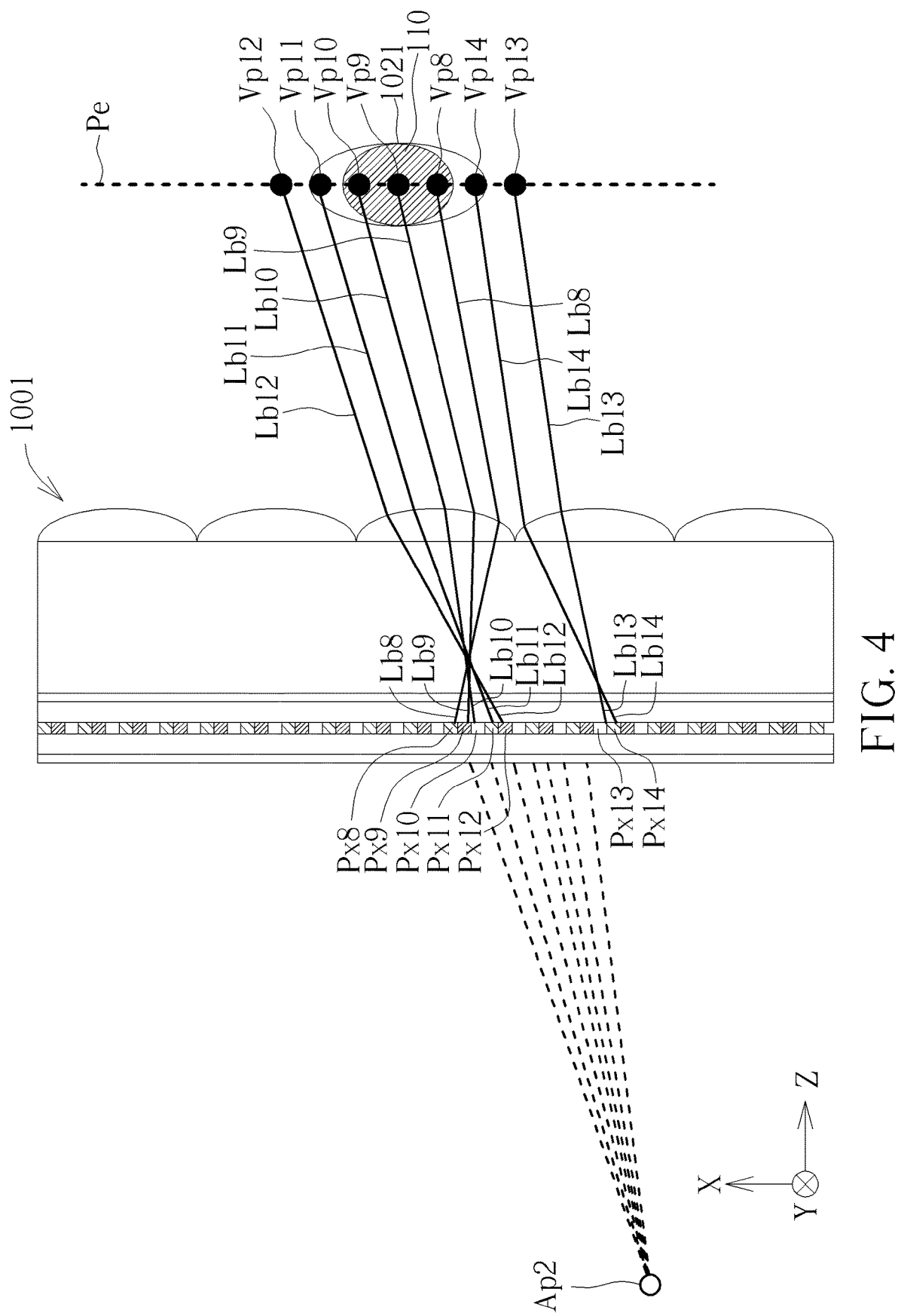
FIG. 4 is a schematic diagram of another example for focusing of an eye according to the present disclosure.

The methods of adjusting the accommodation position of an eye according to the present disclosure are described in the following. Please refer to FIG. 3 and FIG. 4. FIG. 3 is a schematic diagram of an example for focusing of an eye according to the present disclosure. FIG. 4 is a schematic diagram of another example for focusing of an eye according to the present disclosure. The display 1001 and the eye 1021 are used as examples in FIG. 3 and FIG. 4, but this method may also be applied to the display 1003 and the eye 1023. In addition, the optical element and the gaze tracking device are omitted in FIG. 3 and FIG. 4 for simplifying the drawings.

In the example of FIG. 3, a sub-pixel Px1, a sub-pixel Px2, a sub-pixel Px3, a sub-pixel Px4, a sub-pixel Px5, a sub-pixel Px6 and a sub-pixel Px7 of the display 1001 may respectively emit a light beam Lb1, a light beam Lb2, a light beam Lb3, a light beam Lb4, a light beam Lb5, a light beam Lb6 and a light beam Lb7 to a view point Vp1, a view point Vp2, a view point Vp3, a view point Vp4, a view point Vp5, a view point Vp6 and a view point Vp7 on a surface Pe where the eye 1021 is located. The light beam Lb1, the light beam Lb2, the light beam Lb3, the light beam Lb4, the light beam Lb5, the light beam Lb6 and the light beam Lb7 may focus on an accommodation point Ap1, and the accommodation point Ap1 may be located between the display 1001 and the eye 1021 in the direction Z, but not limited herein.

Furthermore, the light beam Lb3, the light beam Lb4 and the light beam Lb5 emitted by the sub-pixel Px3, the sub-pixel Px4 and the sub-pixel Px5 may enter a pupil 110 of the eye 1021 in different view directions. In other words, the eye 1021 may view the light beam Lb3, the light beam Lb4 and the light beam Lb5 emitted by different sub-pixels at the same time. Based on the above principle, each light beam may represent a picture, each picture may be displayed by one or a plurality of corresponding sub-pixels, and different pictures may be displayed by different sub-pixels. Specifically, an image provided by the display 1001 may include the pictures represented by the light beam Lb1 to the light beam Lb7 at the same time, and the eye 1021 may view the pictures represented by the light beam Lb3, the light beam Lb4 and the light beam Lb5 at the same time. Offsets included between the pictures represented by the light beam Lb3, the light beam Lb4 and the light beam Lb5 in the same image may be generated by displaying the pictures represented by the light beam Lb3, the light beam Lb4 and the light beam Lb5 by different sub-pixels, thereby making the eye 1021 focus on the accommodation point Ap1.

In the example of FIG. 4, a sub-pixel Px8, a sub-pixel Px9, a sub-pixel Px10, a sub-pixel Px11, a sub-pixel Px12, a sub-pixel Px13 and a sub-pixel Px14 of the display 1001 may respectively emit a light beam Lb8, a light beam Lb9, a light beam Lb10, a light beam Lb11, a light beam Lb12, a light beam Lb13 and a light beam Lb14 to a view point VP8, a view point Vp9, a view point Vp10, a view point Vp11, a view point Vp12, a view point Vp13 and a view point Vp14 on a surface Pe where the eye 1021 is located. The light beam Lb8, the light beam Lb9, the light beam Lb10, the light beam Lb11, the light beam Lb12, the light beam Lb13 and the light beam Lb14 may focus on another accommodation point Ap2. In addition, in the direction Z, the eye 1021 may be located at a side of the display 1001, and the accommodation point Ap2 may be located at another side of the display 1001, but not limited herein.

Furthermore, the light beam Lb8, the light beam Lb9 and the light beam Lb10 emitted by the sub-pixel Px8, the sub-pixel Px9 and the sub-pixel Px10 may enter the pupil 110 of the eye 1021 in different view directions. In other words, the eye 1021 may view the light beam Lb8, the light beam Lb9 and the light beam Lb10 emitted by different sub-pixels at the same time. Based on the above principle, each light beam may represent a picture, each picture may be displayed by one or a plurality of corresponding sub-pixels, and different pictures may be displayed by different sub-pixels. Specifically, an image provided by the display 1001 may include the pictures represented by the light beam Lb8 to the light beam Lb14 at the same time, and the eye 1021 may view the pictures represented by the light beam Lb8, the light beam Lb9 and the light beam Lb10 at the same time. Offsets included between the pictures represented by the light beam Lb8, the light beam Lb9 and the light beam Lb10 in the same image may be generated by displaying the pictures represented by the light beam Lb8, the light beam Lb9 and the light beam Lb10 by different sub-pixels, thereby making the eye 1021 focus on the accommodation point Ap2.

As shown in FIG. 3 and FIG. 4, the image provided by the display 1001 in FIG. 3 and the image provided by the display 1001 in FIG. 4 may have different offsets through displaying different images (such as the images including the light beams Lb1-Lb7 and the images including the light beams Lb8-Lb14) by different sub-pixels (such as the sub-pixels Px1-Px7 and the sub-pixels Px8-Px14), such that the accommodation positions (such as the accommodation point Ap1 and the accommodation point Ap2) may be adjusted.

In addition, taking FIG. 3 as an example, the view point Vp1, the view point Vp2, the view point Vp6 and the view point Vp7 are located outside the pupil 110, and these view points (or the pictures corresponding to these view points) make the eye 1021 able to view the image while the eye 1021 is moving, that is to say, these view points increase the dimension of the moving range of the eyes.

Figure 5:
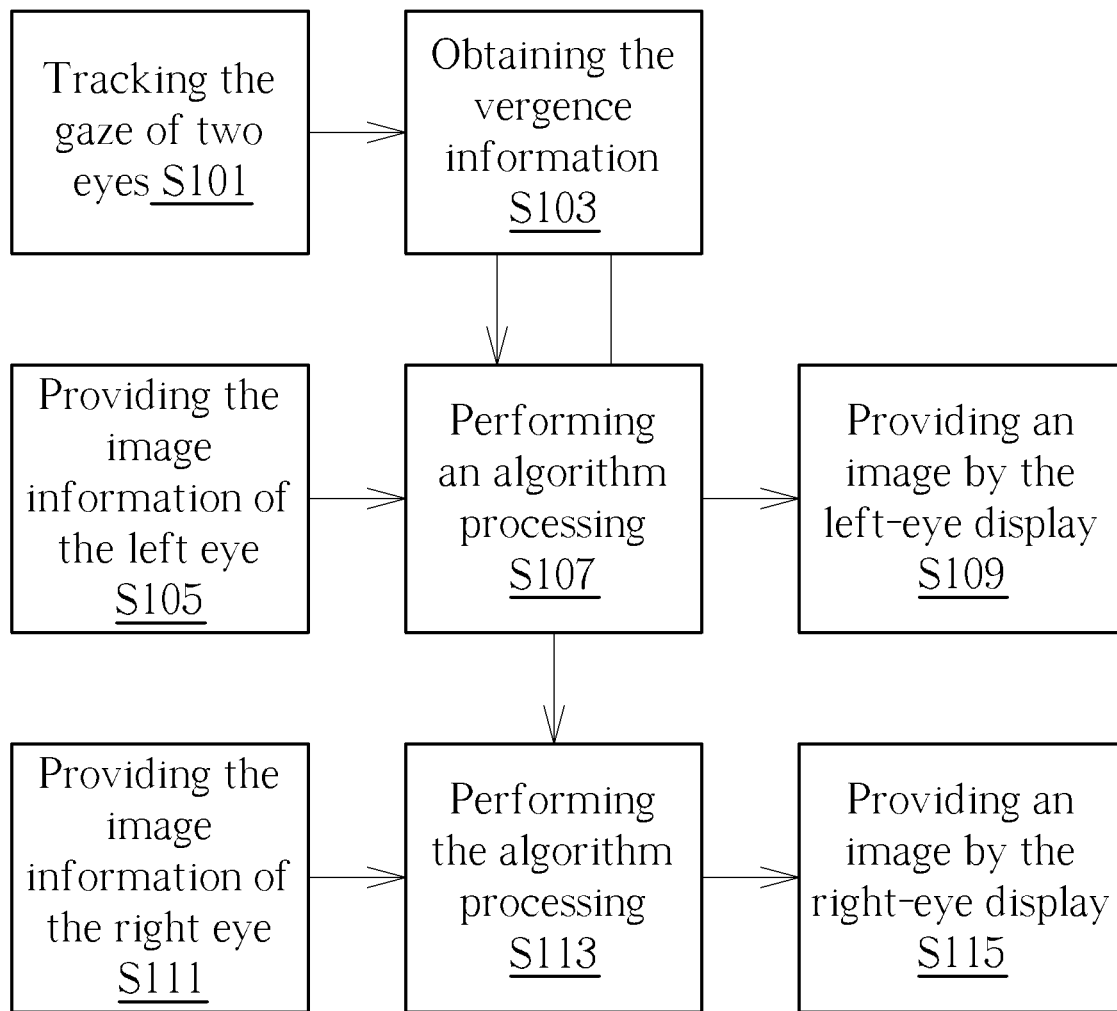
FIG. 5 is a step flow diagram of a display method of an image according to the first embodiment.

Through the above method of adjusting the accommodation position of an eye, the present disclosure further provides a display method of an image, and the discomfort of the user caused by the vergence-accommodation conflict may be mitigated through this method. The image may be, for example, a three-dimensional image, but is not limited herein. Please refer to FIG. 1, FIG. 2 and FIG. 5. FIG. 5 is a step flow diagram of a display method of an image according to the first embodiment. First, the step S101 in FIG. 5 may be performed. The gaze of two eyes (such as the eye 1021 and the eye 1023) of the user may be tracked by the gaze tracking device 106. Then, the step S103 is performed. The vergence information (or the data including the vergence information) of the two eyes obtained through the gaze tracking device 106 may be transmitted from the gaze tracking device 106 to the controller 108 (as shown in FIG. 1). The information may include a vergence vector, a two eyes vector, a vergence surface, etc. The controller 108 may obtain the information, and an information (or the data including the information) of a position (or referred to as a first position) of the vergence surface Pv1 is obtained by calculating through the controller 108.

On the other hand, the step S105 may be further performed. The image information of the left eye (such as the eye 1021) is provided to the controller 108. Then, the step S107 may be performed. The controller 108 may perform an algorithm processing according to the information of the position of the vergence surface Pv1 to obtain an offset that is required to make the eye 1021 focus on the accommodation surface Pa1 (as shown in FIG. 2), and the controller 108 may transmit a display information (or the data including the display information) including the offset to the left-eye display (such as the display 1001 of FIG. 1). Then, the step S109 may be performed. The left-eye display (such as the display 1001) may provide the image V1 according to the display information. The image V1 may be formed on the virtual image surface Pi (as shown in FIG. 1) through the optical element 1041, and the image V1 includes the offset.

Furthermore, the step S111 may be performed. The image information of the right eye (such as the eye 1023) is provided to the controller 108. Then, the step S113 may be performed. The controller 108 may perform the algorithm processing according to the information of the position of the vergence surface Pv1 to obtain an offset that is required to make the eye 1023 focus on the accommodation surface Pa1 (as shown in FIG. 2), and the controller 108 may transmit a display information including the offset to the right-eye display (such as the display 1003 of FIG. 1). Then, the step S115 may be performed. The right-eye display (such as the display 1003) may provide the image V2 according to the display information. The image V2 may be formed on the virtual image surface Pi (as shown in FIG. 1) through the optical element 1043, and the image V2 includes the offset. The step S105 to the step S109 and the step S111 to the step S115 may be performed at the same time, but not limited herein.

As shown in the example of FIG. 2, after the controller 108 obtains the information of the position of the vergence surface Pv1 of the two eyes through the gaze tracking device 106 and calculates by the algorithm, the controller 108 may control the display 1001 and the display 1003 to provide the image V1 and the image V2 having the offsets. The user may consequently view a picture S in the three-dimensional virtual picture V3 at the position of the vergence surface Pv1 by viewing the image V1 through the eye 1021 and viewing the image V2 through the eye 1023.

In addition, a picture T1, a picture T2 and a picture T3 are displayed at the same time in the image V1, and the picture S in the three-dimensional virtual picture V3 may correspond to the picture T1, the picture T2 and the picture T3 in the image V1. The picture T1, the picture T2 and the picture T3 are the picture S viewed in different view directions (such as three different dashed lines in FIG. 2), and the picture T1, the picture T2 and the picture T3 are different from each other and have offsets between each other. As the principle illustrated in FIG. 3 or FIG. 4, the offsets may make the eye 1021 focus on the accommodation surface Pa1 when the eye 1021 views the image V1 and simultaneously views the picture T1, the picture T2 and the picture T3.

On the other hand, a picture T4, a picture T5 and a picture T6 are displayed at the same time in the image V2, and the picture S in the three-dimensional virtual picture V3 may correspond to the picture T4, the picture T5 and the picture T6 of the image V2. The picture T4, the picture T5 and the picture T6 are the picture S viewed in different view directions (such as three different dashed lines in FIG. 2), and the picture T4, the picture T5 and the picture T6 are different from each other and have offsets between each other. As the principle illustrated in FIG. 3 or FIG. 4, the offsets may make the eye 1023 focus on the accommodation surface Pa1 when the eye 1023 views the image V2 and simultaneously views the picture T4, the picture T5 and the picture T6.

In addition, a picture U7, a picture U8 and a picture U9 may also be displayed at the same time in the image V1. The picture U7, the picture U8 and the picture U9 may be different from each other and may also have offsets between each other. The offsets may make the eye 1021 focus on the accommodation surface Pa1 and view the picture R2 in the three-dimensional virtual picture V3 when the eye 1021 views the image V1 and simultaneously views the picture U7, the picture U8 and the picture U9. On the other hand, a picture U10, a picture U11 and a picture U12 in the image V2 may also be displayed at the same time in the image V2. The picture U10, the picture U11 and the picture U12 may be different from each other and may also have offsets between each other. The offsets may make the eye 1023 focus on the accommodation surface Pa1 and view the picture R1 in the three-dimensional virtual picture V3 when the eye 1023 views the image V2 and simultaneously views the picture U10, the picture U11 and the picture U12.

In the example of FIG. 2, the picture R1 and the picture R2 in the three-dimensional virtual picture V3 may be separate pictures when the eye 1021 and the eye 1023 converge on the vergence surface Pv1 and may clearly see the picture S in the three-dimensional virtual picture V3. For example, the picture S may be an object in the three-dimensional virtual picture V3, and the picture R1 and the picture R2 may be another object in the three-dimensional virtual picture V3, but not limited herein.

Figure 6:
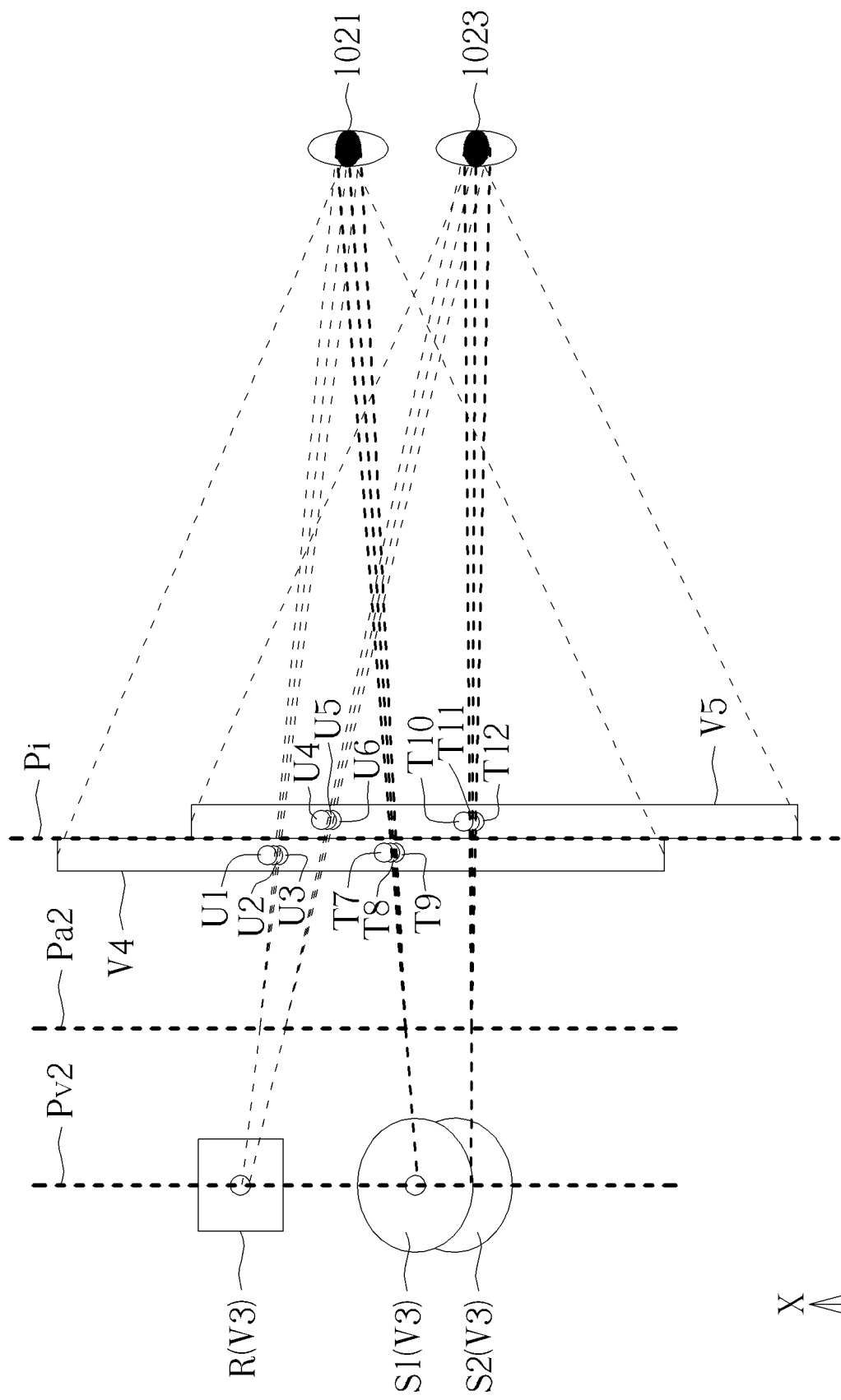
FIG. 6 is a schematic diagram of another example for a display method of an image according to the first embodiment.

Please refer to FIG. 6. FIG. 6 is a schematic diagram of another example for a display method of an image according to the first embodiment. In the example of FIG. 6, the position of the vergence surface Pv2 is different from the position of the vergence surface Pv1 in FIG. 2 in the direction Z. After the controller 108 obtains the information of the position of the vergence surface Pv2 of the two eyes through the gaze tracking device 106 and calculates by the algorithm, the controller 108 may control the display 1001 and the display 1003 to provide the image V4 and the image V5 having the offsets. Since the position of the vergence surface Pv2 in FIG. 6 is different from the position of the vergence surface Pv1 in FIG. 2, the offset of the image V4 may be different from the offset of the image V1 and the offset of the image V5 may be different from the offset of the image V2 after calculated by the algorithm. The user may consequently view a picture R in the three-dimensional virtual picture V3 at the position of the vergence surface Pv2 by viewing the image V4 through the eye 1021 and viewing the image V5 through the eye 1023.

In addition, a picture U1, a picture U2 and a picture U3 are displayed at the same time in the image V4, and the picture R in the three-dimensional virtual picture V3 may correspond to the picture U1, the picture U2 and the picture U3 in the image V4. The picture U1, the picture U2 and the picture U3 are the picture R viewed in different view directions (such as three different dashed lines in FIG. 6), and the picture U1, the picture U2 and the picture U3 are different from each other and have offsets between each other. As the principle illustrated in FIG. 3 or FIG. 4, the offsets may make the eye 1021 focus on the accommodation surface Pa2 when the eye 1021 views the image V4 and simultaneously views the picture U1, the picture U2 and the picture U3, and the position of the accommodation surface Pa2 in FIG. 6 is different from the position of the accommodation surface Pa1 in FIG. 2 in the direction Z.

On the other hand, a picture U4, a picture U5 and a picture U6 are displayed at the same time in the image V5, and the picture R in the three-dimensional virtual picture V3 may correspond to the picture U4, the picture U5 and the picture U6 in the image V5. The picture U4, the picture U5 and the picture U6 are the picture R viewed in different view directions (such as three different dashed lines in FIG. 6), and the picture U4, the picture U5 and the picture U6 are different from each other and have offsets between each other. As the principle illustrated in FIG. 3 or FIG. 4, the offsets may make the eye 1023 focus on the accommodation surface Pa2 when the eye 1023 views the image V5 and simultaneously views the picture U4, the picture U5 and the picture U6.

In addition, a picture T7, a picture T8 and a picture T9 may also be displayed at the same time in the image V4. The picture T7, the picture T8 and the picture T9 may be different from each other and may also have offsets between each other. The offsets may make the eye 1021 focus on the accommodation surface Pa2 and view the picture S1 in the three-dimensional virtual picture V3 when the eye 1021 views the image V4 and simultaneously views the picture T7, the picture T8 and the picture T9. On the other hand, a picture T10, a picture T11 and a picture T12 may also be displayed at the same time in the image V5. The picture T10, the picture T11 and the picture T12 may be different from each other and may also have offsets between each other. The offsets may make the eye 1023 focus on the accommodation surface Pa2 and view the picture S2 in the three-dimensional virtual picture V3 when the eye 1023 views the image V5 and simultaneously views the picture T10, the picture T11 and the picture T12.

In the example of FIG. 6, the picture S1 and the picture S2 in the three-dimensional virtual picture V3 may be separate pictures when the eye 1021 and the eye 1023 converge on the vergence surface Pv2 and may clearly see the picture R in the three-dimensional virtual picture V3. For example, the picture R may be an object in the three-dimensional virtual picture V3, and the picture S1 and the picture S2 may be another object in the three-dimensional virtual picture V3, but not limited herein.

As shown in FIG. 2 and FIG. 6, in the display method of the image of this embodiment, the position (or referred to as a second position) of the accommodation surface (such as the accommodation surface Pa1 or the accommodation surface Pa2) of an eye (such as the eye 1021 or the eye 1023) may be adjusted by adjusting the offset of the image (such as the image V1, the image V2, the image V4 or the image V5) through the controller 108. In addition, the position of the accommodation surface of an eye of the user may be different from the position of the virtual image surface in the direction Z, or the accommodation surface may be located between the vergence surface and the virtual image surface in the direction Z. Therefore, the distance difference between the position of the accommodation surface and the position of the vergence surface may be reduced, thereby mitigating the discomfort of the user caused by the vergence-accommodation conflict.

Taking FIG. 2 as an example, when the position of the accommodation surface Pa1 is farther from the eye 1021 or the eye 1023 of the user, or when the position of the accommodation surface Pa1 is closer to the position of the vergence surface Pv1, the pictures represented by the light beam Lb3, the light beam Lb4 and the light beam Lb5 in FIG. 3 occurs crosstalk with each other in the pupil 110. Therefore, in this embodiment, making the accommodation surface located between the vergence surface and the virtual image surface in the direction Z may reduce the influence of the crosstalk described above, so as to improve the viewing quality of the user.

Taking FIG. 2 as an example, a first distance dv exists between the vergence surface Pv1 and the eye 1021 (or the eye 1023), a second distance da exists between the accommodation surface Pa1 and the eye 1021 (or the eye 1023), and distance difference Δd exists between the first distance dv and the second distance da. In some embodiments, the distance difference Δd may satisfy a relation below:

$$da+(dv/1.3052-0.2657*dv)<\Delta d<da-(dv/1.1286+0.442*dv).$$

When the controller 108 controls the display 1001 and the display 1003 to provide the image V1 and the image V2 having the offsets calculated by the algorithm and makes the position of the accommodation surface Pa1 of the eye 1021 (or the eye 1023) satisfy the above relation, the crosstalk may be reduced, so as to improve the viewing quality of the user, and meanwhile the distance difference Δd may be reduced, so as to mitigate the discomfort of the user caused by the vergence-accommodation conflict.

The display (such as display 1001 or the display 1003) may include light emitting diodes, liquid crystal, fluorescence, phosphors, other suitable display media or combinations of the above, but not limited herein. The light-emitting diodes may, for example, include organic light-emitting diodes (OLEDs), inorganic light-emitting diodes (LEDs), mini-light-emitting diodes (mini LEDs, millimeter sized LEDs), micro-light-emitting diodes (micro-LEDs, micrometer sized LEDs), quantum dots (QDs) light-emitting diodes (e.g. QLEDs or QDLEDs), other suitable light-emitting diodes or any combination of the above, but not limited herein. The display 1001 and the display 1003 may be a bendable or flexible display device.

As shown in FIG. 3, a plurality of lenses 112 may be disposed on the surface of the display, and the lenses 112 may have different shapes according to different optical requirements, but not limited herein. A barrier having openings or a holographic optical element (HOE) may be disposed on the surface of the display 1001 (or the display 1003), but not limited herein. In addition, the display 1001 (or the display 1003) may include a three-dimensional back light unit (3D BLU), but not limited herein.

The optical element (such as the optical element 1041 or the optical element 1043) may include an image surface shift system, but not limited herein. The mage surface shift system may include a projector system, a light filed technology element, a folding light path element or combinations of the above, but not limited herein. The projector system may include a lens projector, but not limited herein. The light filed technology element may include a holographic optical element, an integral image element or combinations of the above, but not limited herein. The folding light path element may include a multi-mirror and space element, but not limited herein.

As shown in FIG. 1, the image V1 or the image V2 may include a fixed surface plane, but not limited herein. The fixed surface plane may include a single surface, and the image V1 or the image V2 may be a vertical surface or an inclined surface. In this condition, the optical element (such as the optical element 1041 or the optical element 1043) may include a projection optical element (POE), but not limited herein. The projection optical element may include a lens, a liquid crystal lens, a concave mirror, a holographic optical element or combinations of the above, and the lens may include a Fresnel lens, a geometry lens or combinations of the above, but not limited herein.

In addition, the image V1 or the image V2 may include a changeable image surface, but not limited herein. For example, the distance between the image V1 (or the image V2) and the eye 1021 (or the eye 1023) may change with different times, but not limited herein. The changeable image surface may include a single surface changing by time or a partial image changing by time, but not limited herein. In this condition, the optical element (such as the optical element 1041 or the optical element 1043) may include a focus adjustable projection optical element, and the focus adjustable projection optical element may include a liquid crystal lens, a holographic optical element with liquid crystal, a polarizer type projection optical element or combinations of the above, but not limited herein.

The gaze tracking device 106 may include an eye tracking sensor, a gaze tracking sensor or combinations of the above, but not limited herein. The controller 108 may include programmable program to perform the algorithm processing, which may include, for example, a central processing unit (CPU), a system on chip (SoC), an application specific integrated circuit (ASIC), etc., but not limited herein.

Other embodiments of the present disclosure will be disclosed in the following. In order to simplify the illustration, the same elements in the following would be labeled with the same symbol. For clearly showing the differences between various embodiments, the differences between different embodiments are described in detail below, and repeated features will not be described redundantly. In addition, theses repeated features may be applied in various embodiments in the following.

Figure 7:
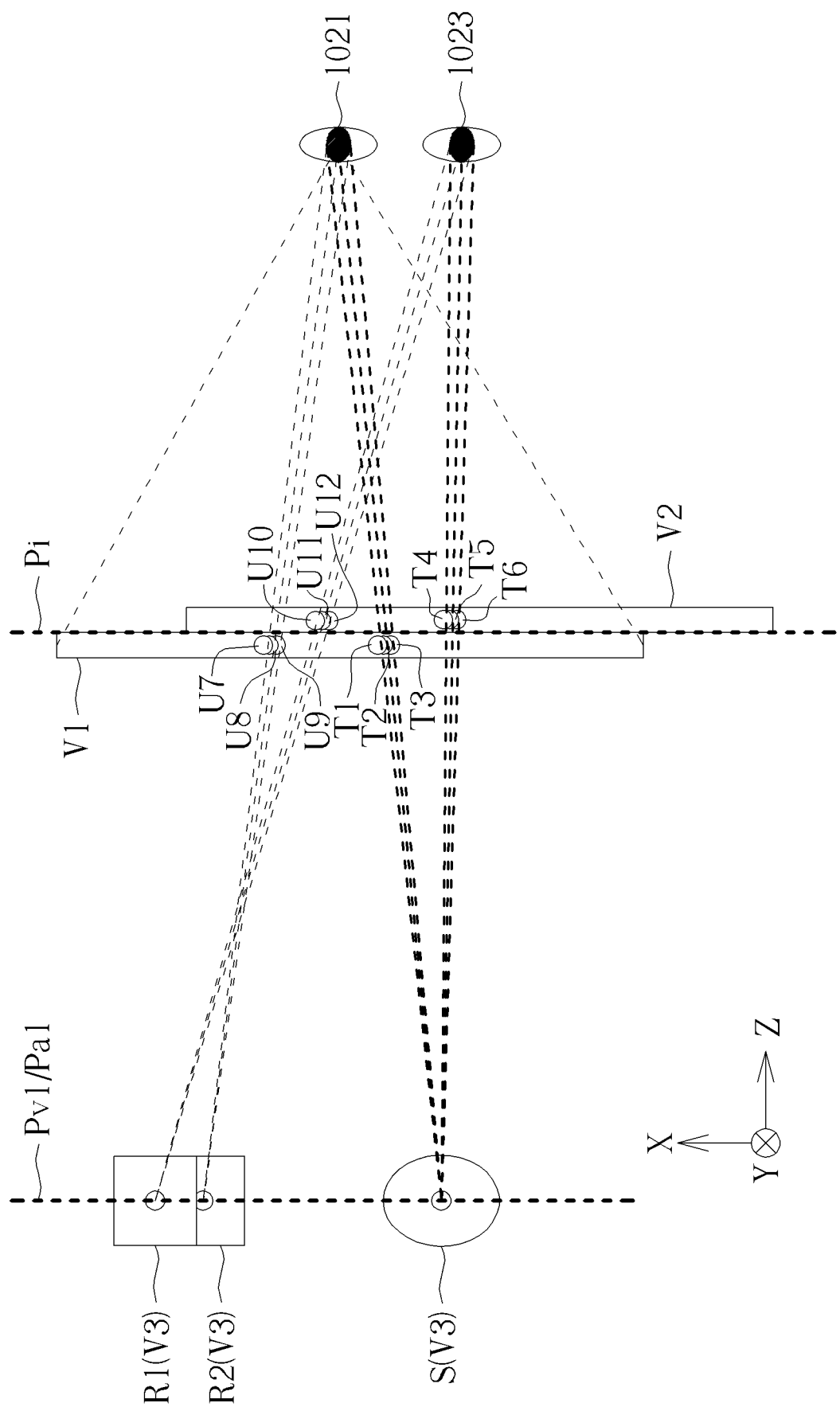
FIG. 7 is a schematic diagram of a display method of an image according to a second embodiment.

Please refer to FIG. 7. FIG. 7 is a schematic diagram of a display method of an image according to a second embodiment. In some embodiments (such as FIG. 7), after the controller 108 obtains the information of the position of the vergence surface Pv1 of the two eyes through the gaze tracking device 106 and calculates by the algorithm, the controller 108 may control the display 1001 and the display 1003 to provide the image V1 and the image V2 having the offsets. The offset of the image V1 and the offset of the image V2 may make the eye 1021 and the eye 1023 focus on the accommodation surface Pa1 when the eye 1021 views the image V1 and the eye 1023 views the image V2, and the position (or referred to as the second position) of the accommodation surface Pa1 is the same as the position (or referred to as the first position) of the vergence surface Pv1.

In real life, the position of the accommodation surface of an eye of a user is the same as the position of the vergence surface of two eyes of the user. Through the display method of the image of this embodiment, when the user views the three-dimensional image by the electronic device 10, the viewing status of the user may be the same as the viewing status in real life, and the discomfort caused by the vergence-accommodation conflict may be mitigated.

Figure 8:
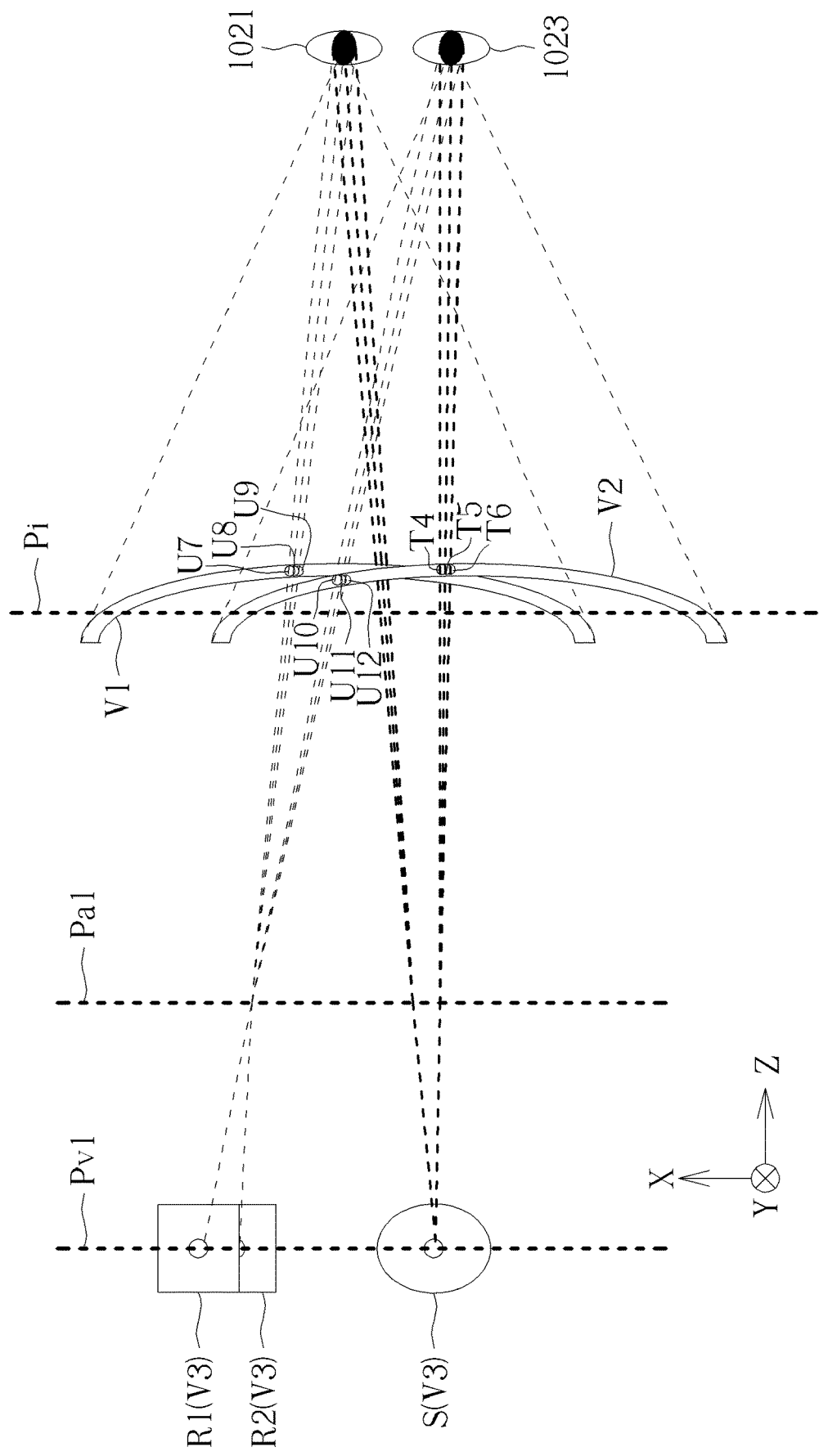
FIG. 8 is a schematic diagram of a display method of an image according to a third embodiment.

Please refer to FIG. 8. FIG. 8 is a schematic diagram of a display method of an image according to a third embodiment. The image V1 and the image V2 are crossed and partially overlapped with each other in FIG. 8, so the picture T1, the picture T2 and the picture T3 in the image V1 are not illustrated. In some embodiments, the image V1 (or the image V2) may be a non-planar image. The non-planar image described above may be a deformed image, and the non-planar image may include an image with any shape such as a spherical image, an aspherical image, a symmetrical image or an asymmetry image, but not limited herein. As shown in FIG. 8, the image V1 (or the image V2) may be a curved image, and the image V1 (or the image V2) may have the same curvature or different curvatures in the direction X, the direction Y and/or the direction Z, but not limited herein.

In order to avoid that the image viewed by the user through the electronic device 10 is deformed, in the display method of the image of this embodiment, the required offsets of the image V1 and the image V2 may be obtained through the controller 108 by calculating through the algorithm according to the non-planar images. When the eye 1021 views the image V1 and the eye 1023 views the image V2, the offset of the image V1 and the offset of the image V2 may make the accommodation surface Pa1 where the eye 1021 or the eye 1023 is focused become a plane, and also make the vergence surface Pv1 where the eye 1021 and the eye 1023 are converged become a plane. Therefore, even if the image V1 and the image V2 provided by the display 1001 and the display 1003 are deformed, the image viewed by the user may be a normal image without deformation.

Figure 9:
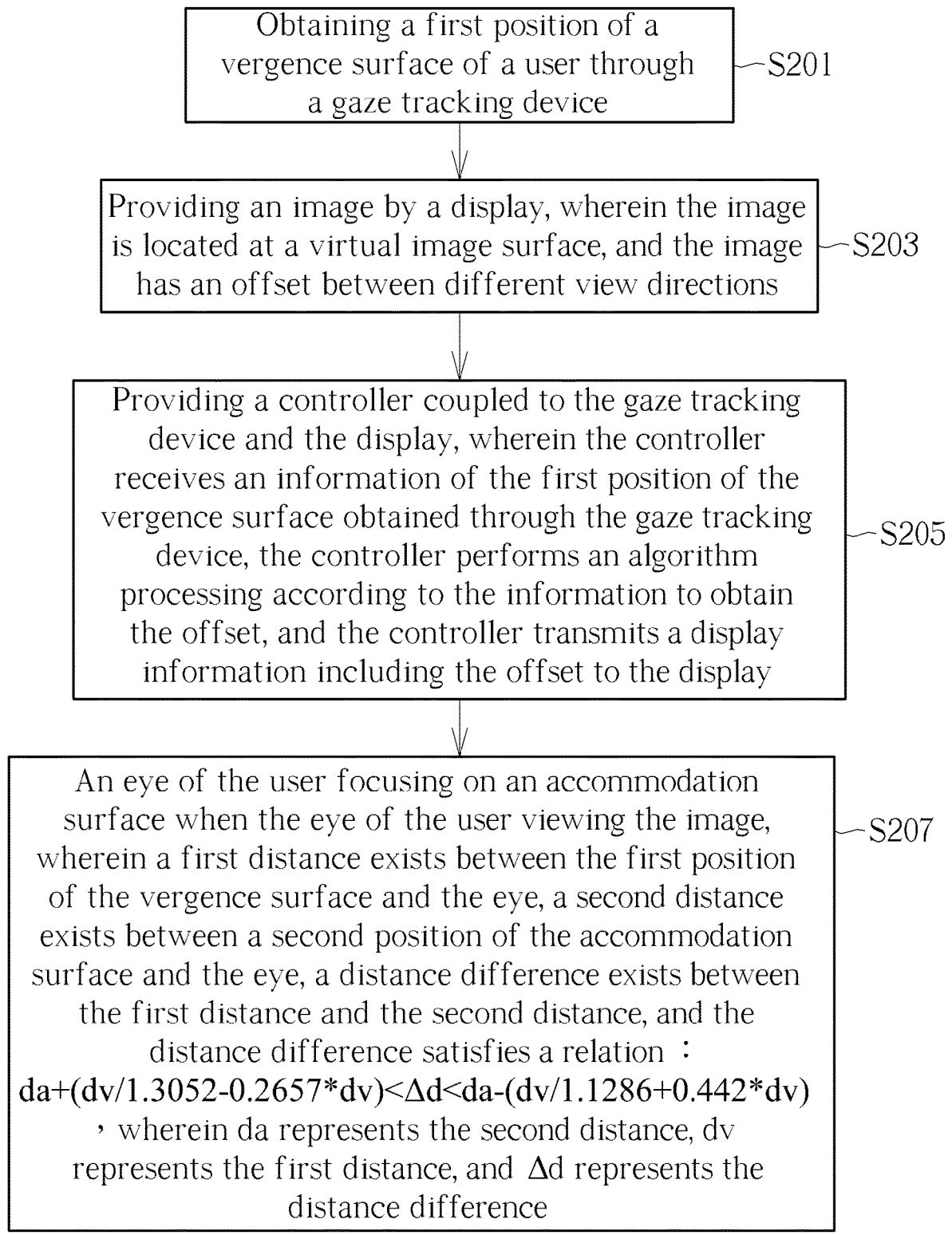
FIG. 9 is a step flow diagram of a display method of an image according to an embodiment of the present disclosure.

According to the above illustration, please refer to FIG. 9. FIG. 9 is a step flow diagram of a display method of an image according to an embodiment of the present disclosure. The following steps may not be exhaustive, and other steps may be performed before, after or between any of the steps that ate shown. In addition, some steps may be performed in a different order. One of the display methods of the image of the present disclosure may mainly include, but not limited herein, the steps shown in FIG. 9:

Step S201: obtaining a first position of a vergence surface of a user through a gaze tracking device;

Step S203: providing an image by a display, wherein the image is located at a virtual image surface, and the image has an offset between different view directions;

Step S205: providing a controller coupled to the gaze tracking device and the display, wherein the controller receives an information of the first position of the vergence surface obtained through the gaze tracking device, the controller performs an algorithm processing according to the information to obtain the offset, and the controller transmits a display information including the offset to the display; and Step S207: an eye of the user focusing on an accommodation surface when the eye of the user viewing the image, wherein a first distance exists between the first position of the vergence surface and the eye, a second distance exists between a second position of the accommodation surface and the eye, a distance difference exists between the first distance and the second distance, and the distance difference satisfies a relation: $da+(dv/1.3052-0.2657*dv)<\Delta d<da-(dv/1.1286+0.442*dv)$, wherein da represents the second distance, dv represents the first distance, and $\Delta d$ represents the distance difference.

In addition, please refer to FIG. 3. In some embodiments, the controller 108 may control the sub-pixel Px1 to the sub-pixel Px7 of the display 1001 to emit the light beam Lb1 to the light beam Lb7 to the eye 1021 at different time points, and a time difference may exist between the time points that different sub-pixels emit light beams. For example, a time difference may exist between the time point that the sub-pixel Px1 emits the light beam Lb1 and the time point that the sub-pixel Px2 emits the light beam Lb2. The brain may consider that the light beam Lb1 to the light beam Lb7 are simultaneously received by the eye 1021 when the time differences of light beams emitted by different sub-pixels are short enough.

Furthermore, each light beam may respectively represent a picture, each picture may be displayed by one or a plurality of corresponding sub-pixels, and different pictures may be displayed by different sub-pixels. Based on the above principle, a plurality of pictures may be provided to the eye 1021 by the display at different time points, and these pictures may be different from each other. When the time differences between sending different pictures are short enough, the brain may perceive that the eye 1021 is viewing an image having an offset, thereby making the eye 1021 focus on the accommodation point Ap1. The method of adjusting the accommodation surface of the eye 1021 (or the eye 1023) through the controller 108 performing the algorithm processing (obtaining the offsets) may be the same as the above embodiments, and will not be described redundantly herein.

Figure 10:
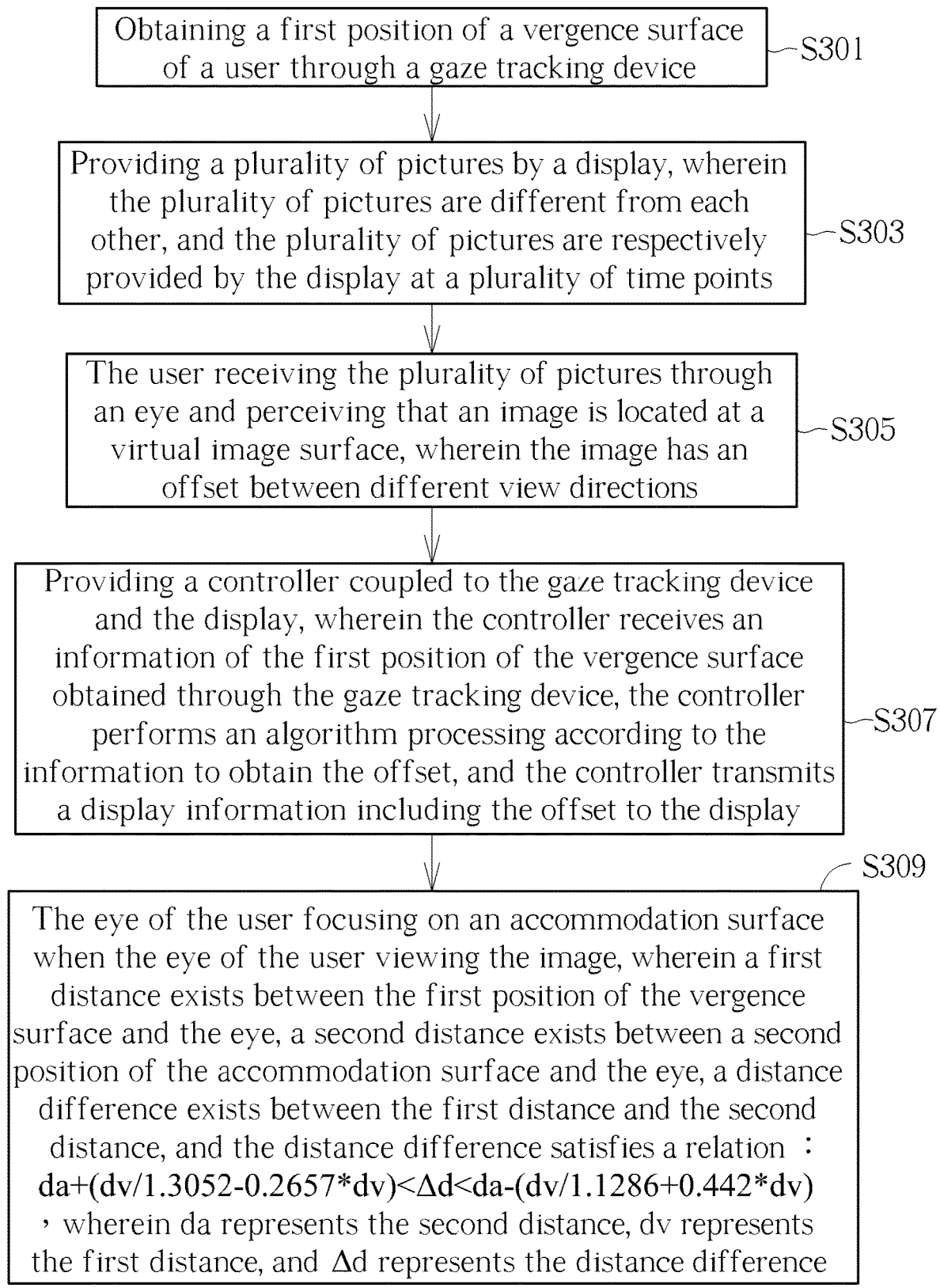
FIG. 10 is a step flow diagram of a display method of an image according to another embodiment of the present disclosure.

Therefore, another display method of the image of the present disclosure may mainly include, but not limited herein, the steps shown in FIG. 10:

Step S301: obtaining a first position of a vergence surface of a user through a gaze tracking device;

Step S303: providing a plurality of pictures by a display, wherein the plurality of pictures are different from each other, and the plurality of pictures are respectively provided by the display at a plurality of time points;

Step S305: the user receiving the plurality of pictures through an eye and perceiving that an image is located at a virtual image surface, wherein the image has an offset between different view directions;

Step S307: providing a controller coupled to the gaze tracking device and the display, wherein the controller receives an information of the first position of the vergence surface obtained through the gaze tracking device, the controller performs an algorithm processing according to the information to obtain the offset, and the controller transmits a display information including the offset to the display; and Step S309: the eye of the user focusing on an accommodation surface when the eye of the user viewing the image, wherein a first distance exists between the first position of the vergence surface and the eye, a second distance exists between a second position of the accommodation surface and the eye, a distance difference exists between the first distance and the second distance, and the distance difference satisfies a relation: $da+(dv/1.3052-0.2657*dv)<\Delta d<da-(dv/1.1286+0.442*dv)$, wherein da represents the second distance, dv represents the first distance, and $\Delta d$ represents the distance difference.

In the display method of the image of the present disclosure, the position of the accommodation surface of the eye can be adjusted by adjusting the offset of the image provided by the display through the controller, so that the position of the accommodation surface is different from the position of the virtual image surface, or the accommodation surface is located between the vergence surface and the virtual image surface, or the position of the accommodation surface is the same as the position of the vergence surface of the two eyes. Therefore, the distance difference between the position of the accommodation surface and the position of the vergence surface can be reduced, thereby mitigating the discomfort of the user caused by the vergence-accommodation conflict.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display method of an image, comprising:
obtaining a first position of a vergence surface of a user through a gaze tracking device;
providing an image by a display, wherein the image is located at a virtual image surface, and the image has an offset between different view directions;
providing a controller coupled to the gaze tracking device and the display, wherein the controller receives an information of the first position of the vergence surface obtained through the gaze tracking device, the controller performs an algorithm processing according to the information to obtain the offset, and the controller transmits a display information comprising the offset to the display; and
an eye of the user focusing on an accommodation surface when the eye of the user viewing the image, wherein a first distance exists between the first position of the vergence surface and the eye, a second distance exists between a second position of the accommodation surface and the eye, a distance difference exists between the first distance and the second distance, and the distance difference satisfies a relation:

$$da+(dv/1.3052-0.2657*dv)<\Delta d<da-(dv/1.1286+0.442*dv),$$

wherein da represents the second distance, dv represents the first distance, and $\Delta d$ represents the distance difference.

2. The display method of the image according to claim 1, wherein the second position of the accommodation surface is different from the first position of the vergence surface.

3. The display method of the image according to claim 2, wherein the accommodation surface is located between the vergence surface and the virtual image surface.

4. The display method of the image according to claim 1, wherein the second position of the accommodation surface is the same as the first position of the vergence surface.

5. The display method of the image according to claim 1, wherein the second position of the accommodation surface of the eye is adjusted by adjusting the offset of the image through the controller.

6. The display method of the image according to claim 1, wherein the image is a non-planar image.

7. The display method of the image according to claim 1, further comprising providing an electronic device, wherein the electronic device comprises the controller, the gaze tracking device, the display and an optical element, wherein the optical element is coupled to the controller and disposed between the eye of the user and the display.

8. The display method of the image according to claim 7, wherein the image provided by the display is formed on the virtual image surface through the optical element.

9. The display method of the image according to claim 1, wherein the optical element comprises at least one lens.

10. A display method of an image, comprising:
obtaining a first position of a vergence surface of a user through a gaze tracking device;
providing a plurality of pictures by a display, wherein the plurality of pictures are different from each other, and the plurality of pictures are respectively provided by the display at a plurality of time points;
the user receiving the plurality of pictures through an eye and perceiving that an image is located at a virtual image surface, wherein the image has an offset between different view directions;
providing a controller coupled to the gaze tracking device and the display, wherein the controller receives an information of the first position of the vergence surface obtained through the gaze tracking device, the controller performs an algorithm processing according to the information to obtain the offset, and the controller transmits a display information comprising the offset to the display; and the eye of the user focusing on an accommodation surface when the eye of the user viewing the image, wherein a first distance exists between the first position of the vergence surface and the eye, a second distance exists between a second position of the accommodation surface and the eye, a distance difference exists between the first distance and the second distance, and the distance difference satisfies a relation:

$$da+(dv/1.3052-0.2657*dv)<\Delta d<da-(dv/1.1286+0.442*dv),$$

wherein da represents the second distance, dv represents the first distance, and $\Delta d$ represents the distance difference.

\* \* \* \* \*